United States Patent Office 2,722,555
Patented Nov. 1, 1955

2,722,555

ETHERS OF ANTHRACENE-9,10-DIMETHANOL

Roger W. Amidon, Oakland, N. J., assignor to United States Rubber Company, New York, N. Y., a corporation of New Jersey No Drawing. Application January 8, 1954,
Serial No. 403,077

3 Claims. (Cl. 260—611)

This invention relates to a new class of compounds, the di-ethers of 9,10-anthracenedimethanol.

These ethers are made from the known compound 9,10-di(chloromethyl)anthracene and the appropriate alcohol or phenol and an alkali hydroxide, in a suitable solvent.

The solvent is an excess of the alcohol in most cases. When the alcohol boils at so high a temperature as to be difficult to recover by distillation, or when a phenol is used as the reagent, I prefer to use little or no excess of the alcohol or phenol, and in such case I dilute the reagent mixture with an inert solvent such as butanone.

Instead of an alkali hydroxide, I can use an alkali carbonate, especially when I prepare an ether of a phenol.

Alternatively, I can also prepare my new ethers from the di(chloromethyl)anthracene and an alcoholate of an alkali metal. This variation of the method is usually more expensive than the preferred process in which an alcohol and an alkali hydroxide are used.

The following examples illustrate my invention. All parts and percentages are by weight.

*Example 1*

A mixture of 65 parts of methanol, 5.5 parts of 9,10-di(chloromethyl)anthracene and 5.3 parts of potassium hydroxide (assaying 85% KOH) was boiled under reflux for 80 minutes. The hot solution was filtered to remove potassium chloride. When the filtrate was cooled to room temperature, the new compound, the dimethyl ether of 9,10-anthracenedimethanol, crystallized. The yield of the light yellow solid was 3.7 parts, or 70% of theory. It was almost quantitatively recovered after recrystallization from methanol, and melted at 181–183° C. After it was further recrystallized from dioxan and then sublimed at 170° C. at one mm. Hg, it melted at 183–185° C.

*Analysis.*—Calcd. for $C_{18}H_{18}O_2$: carbon 81.16%; hydrogen 6.82%. Found: carbon 80.82%; hydrogen 6.60%.

*Example 2*

The diethyl ether of 9,10-anthracenedimethanol was made by the method described in Example 1 except that absolute ethanol (160 parts) was used instead of methanol. The reaction mixture was filtered hot, and again at room temperature. The yield of the yellow diethyl ether of 9,10-anthracenedimethanol was 3.2 parts, or 54% of theory. It melted at 140–142° C. After it was recrystallized from a mixture of water and the dimethyl ether of ethylene glycol, and was sublimed at 130° C. at 0.2 mm. Hg, it formed straw-colored, greasy platelets which melted at 139–141° C.

*Analysis.*—Calcd. for $C_{20}H_{22}O_2$: carbon 81.50%; hydrogen 7.53%. Found: carbon 81.69%; hydrogen 7.50%.

*Example 3*

The diallyl ether of 9,10-anthracenedimethanol was made by the method described in Example 1 except that allyl alcohol (85 parts) was used instead of methanol, and the mixture was refluxed for only 10 minutes. The hot solution was filtered. As nothing crystallized from the cooled filtrate, it was poured into water. The crude yellow solid so precipitated was purified by two crystallizations from petroleum ether. The yellow diallyl ether of 9,10-anthracenedimethanol melted at 97–103° C.

*Example 4*

A mixture of 5.5 parts of 9,10-di(chloromethyl) anthracene, 5.5 parts of anhydrous potassium carbonate, 4.1 parts of phenol and 80 parts of butanone was boiled under reflux for 18 hours, and then was poured into a large amount of water to precipitate a yellow solid. This material was a mixture which was difficult to separate by recrystallization from the usual organic solvents. Therefore, a portion of the mixture was fractionated by chromatographic adsorption on activated alumina. The diphenyl ether of 9,10-anthracenedimethanol so obtained was a pale yellow solid which melted at 251–254.5° C. This ether very slowly decomposes in air to give phenol and unidentified decomposition products.

*Analysis.*—Calcd. for $C_{28}H_{22}O_2$: carbon 86.1%; hydrogen 5.6%. Found: carbon 87.2%; hydrogen 5.9%.

The ethers of this invention are useful in making condensation polymers which are polyesters of 9,10-anthracenedimethanol with dibasic acids, such as succinic acid, adipic acid, maleic acid, fumaric acid and phthalic acid. These polyesters are made by reacting one of my new ethers with an appropriate dibasic acid, or its anhydride, if available, in the presence of a strong mineral acid, e. g., sulfuric acid, as a catalyst, in a suitable solvent such as dioxan. Gentle heat is applied, if necessary, to hasten the reaction. This method of making the polyesters is preferred to direct esterification of the dimethanol, because of the insolubility of the latter. These condensation polymers can be molded into articles, such as capacitors, which are of use to the electrical industry because of their high dielectric constants.

The allylic ethers also have an additional use; namely, as monomers for cross-linking polymers which are not of themselves capable of forming cross-linked, i. e., insoluble and infusible, resins. Such polymers are polystyrene, polymers of esters of acrylic or methacrylic acid. This cross-linking reaction takes place by free radical mechanism in the presence of a peroxide to form still other molded products which are likewise useful as capacitors.

Having thus described my invention, what I claim and desire to protect by Letters Patent is:

1. A di-ether of 9,10-anthracenedimethanol selected from the class consisting of the diallyl ether of 9,10-anthracenedimethanol and the diphenyl ether of 9,10-anthracenedimethanol.

2. Diallyl ether of 9,10-anthracenedimethanol.

3. Diphenyl ether of 9,10-anthracenedimethanol.

References Cited in the file of this patent

De Bruyn: Chem. Abstracts, vol. 44 (1950), column 134 (1 p.).